United States Patent
Lee

(10) Patent No.: US 7,605,838 B2
(45) Date of Patent: Oct. 20, 2009

(54) BROADCAST SIGNAL RECEIVING APPARATUS AND METHOD OF FILTERING NOISE SIGNALS

(75) Inventor: Young-jin Lee, Dong-gu (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 612 days.

(21) Appl. No.: 11/218,551

(22) Filed: Sep. 6, 2005

(65) Prior Publication Data

US 2006/0055832 A1    Mar. 16, 2006

(30) Foreign Application Priority Data

Sep. 14, 2004   (KR)   .................. 10-2004-0073388

(51) Int. Cl.
  *H04N 5/38* (2006.01)
  *H04N 5/44* (2006.01)
(52) U.S. Cl. .................. 348/21; 348/725; 348/607; 455/311; 455/313; 455/196.1; 375/346
(58) Field of Classification Search .................. 348/21, 348/731–733, 607, 725, 726; 725/346, 349, 725/350; 455/296, 302, 311, 285, 313, 314, 455/334, 182.1, 196.1
  See application file for complete search history.

(56) References Cited

U.S. PATENT DOCUMENTS 7,239,358 B1 * 7/2007 Mayer .................. 348/731

2006/0232715 A1 * 10/2006 Motte et al. .................. 348/731

FOREIGN PATENT DOCUMENTS

| CN | 1449126 | 10/2003 |
|----|---------|---------|
| JP | 11-88795 | 3/1999 |
| KR | 1994-27514 | 12/1994 |
| KR | 10-216318 | 5/1999 |
| KR | 2002-19522 | 3/2002 |
| WO | WO 01/06768 A1 | 1/2001 |

OTHER PUBLICATIONS

Korean Office Action dated Apr. 24, 2006 issued in KR 2004-73388.
Chinese Office Action dated Nov. 9, 2007 issued in CN 200510091048.9.

* cited by examiner

*Primary Examiner*—M. Lee
(74) *Attorney, Agent, or Firm*—Stanzione & Kim, LLP

(57) ABSTRACT

Broadcast signal-receiving apparatus and a method filtering noise signals. The broadcast signal-receiving apparatus includes a tuner to convert an RF signal to a lower frequency signal to output an intermediate frequency (IF) signal, a filter to filter the IF signal to output a digital IF signal, and a controller to control the tuner to shift a frequency of the IF signal to a frequency band to remove the noise signals if the digital IF signal contains noise signals of a predetermined magnitude. Accordingly, the broadcast signal-receiving apparatus can filter the noise signals resulting from analog and digital broadcast signals adjacent to a digital broadcast signal on a channel selected for viewing.

29 Claims, 5 Drawing Sheets

BROADCAST SIGNAL RECEIVING APPARATUS AND METHOD OF FILTERING NOISE SIGNALS

CROSS-REFERENCE TO RELATED APPLICATIONS

This application claims the benefit under 35 U.S.C. § 119 of Korean Patent Application No. 2004-73388 filed on Sep. 14, 2004 in the Korean Intellectual Property Office, the content of which is incorporated herein by reference in its entirety.

BACKGROUND OF THE INVENTION

1. Field of the Invention

The present general inventive concept relates to a broadcast signal-receiving apparatus and a method of filtering noise signals. More particularly, the present general inventive concept relates to a broadcast signal-receiving apparatus and a method of filtering noise signals introduced by analog and/or digital broadcast signals that are adjacent to a selected digital broadcast signal received on a channel selected for viewing.

2. Description of the Related Art

Digital TV systems can compress, digitally convert, and transmit video and audio signals. Advancements in digital signal processes and communication technologies have lead to the development of a broadcast signal-receiving apparatus capable of receiving digital broadcast signals of an ATSC (Advanced Television System Committee) standard VSB (Vestigial Side Band) system out of digital broadcast signals, together with a NTSC (National Television System Committee) standard analog broadcast signals. These digital and analog broadcasts use the same RF channel bandwidth of 6 MHz such that the broadcast signal-receiving apparatus can use the same antenna and tuner to receive both analog and digital broadcast signals. Thus, analog and/or digital broadcast signals that are adjacent to a selected digital broadcast signal received on a channel selected for viewing occasionally interfere with each other and turn into noise signals.

FIG. 1 illustrates noise signals remaining when adjacent signals are filtered by a conventional broadcast signal receiving apparatus. As illustrated in FIG. 1, a SAW (surface acoustic wave) filter 40 filters a selected digital broadcast signal 10 received on a channel selected for viewing and an adjacent signal 20. A part of the adjacent signal 20 contained in a bandwidth of the SAW filter 40 is not filtered out, but is output together with the selected digital broadcast signal 10 as a noise signal 30. The noise signal 30 is processed together with the selected digital broadcast signal 10 and causes a degradation in quality of video and audio output signals.

The adjacent signal 20 is an analog or a digital broadcast signal that is adjacent to the selected digital broadcast signal 10 received on a channel selected for viewing. When digital and analog broadcasts are simultaneous, an NTSC standard analog broadcast signal is transmitted at a channel frequency adjacent to or identical to the selected digital broadcast signal 10. As a result, serious channel interferences can occur in the selected digital broadcast signal 10, thereby deteriorating signal-receiving characteristics of the broadcast signal-receiving apparatus.

SUMMARY OF THE INVENTION

The present general inventive concept provides a broadcast signal-receiving apparatus and a method of filtering noise signals by shifting frequencies of a selected digital broadcast signal and adjacent signals to a frequency band suitable for noise signal reduction in order to prevent the signals that are adjacent to the selected digital broadcast signal received on a channel selected for viewing from being interfered with by the noise signals.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a broadcast signal-receiving apparatus to receive and process analog and digital broadcast signals of a radio frequency (RF) signal format, comprising a tuner to convert an RF signal to a lower frequency signal to output an intermediate frequency (IF) signal, a filter to filter the IF signal to output a digital IF signal, and a controller to control the tuner to shift a frequency of the IF signal to a frequency band that is suitable for removing the noise signals with the filter when the digital IF signal contains noise signals of a predetermined magnitude.

The broadcast signal-receiving apparatus may further comprise a channel storage unit to store channel frequency information about a plurality of channels that are receivable through the tuner, and an IF signal processor to demodulate the digital IF signal and to correct errors in the demodulated digital IF signal, wherein the controller checks the channel frequency information stored in the channel storage unit to determine whether there is an adjacent channel on one side of a selected first channel, and if there is a channel adjacent to the selected first channel, the controller detects a bit error rate when the IF signal processor corrects the errors in the demodulated digital IF signal, and controls the tuner to shift the frequency of the IF signal of the selected first channel to a frequency band to reduce the bit error rate.

The tuner may include a frequency mixer to mix a frequency of the RF signal with a predetermined first frequency, a local oscillator to generate the predetermined first frequency, and a phase-lock loop (PLL) to control the local oscillator to generate the predetermined first frequency, and the controller controls the PLL to convert the predetermined first frequency to a predetermined second frequency to reduce the bit error rate to a value that is less than a predetermined value when the bit error rate that corresponds to the predetermined first frequency is larger than the predetermined value.

The foregoing and/or other aspects of the present general inventive concept are also achieved by providing a noise signal-filtering method usable in a broadcast signal-receiving apparatus to receive and process analog and digital broadcast signals of a radio frequency signal format, the method comprising converting a frequency of an RF signal received on a selected first channel to a lower frequency to output an intermediate frequency (IF) signal if there is an adjacent channel on one side of the selected first channel, filtering the IF signal to output a digital IF signal, and shifting a frequency of the IF signal to a frequency band that is suitable for removing noise signals in the filtering operation if the digital IF signal is determined to contain noise signals of a predetermined magnitude.

The shifting of the frequency of the IF signal may comprise demodulating the digital IF signal and correcting errors in the demodulated digital IF signal, detecting a bit error rate when correcting errors in the demodulated digital IF signal, and shifting the frequency of the IF signal to a frequency band having a bit error rate that is less than a predetermined value.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
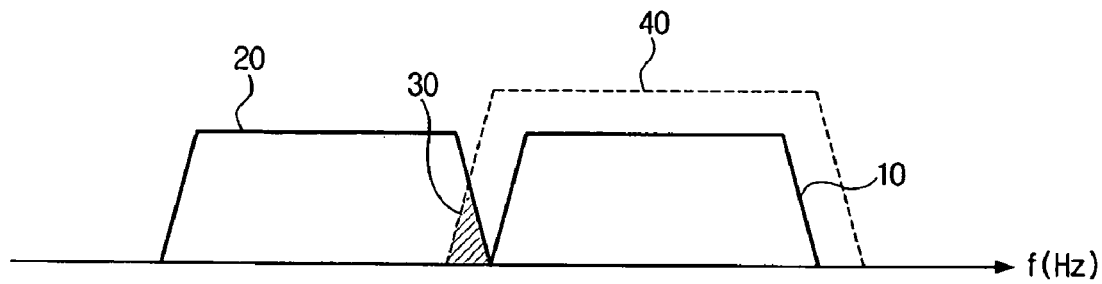
FIG. 1 illustrates noise signals remaining when adjacent signals are filtered by a conventional broadcast signal receiving apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
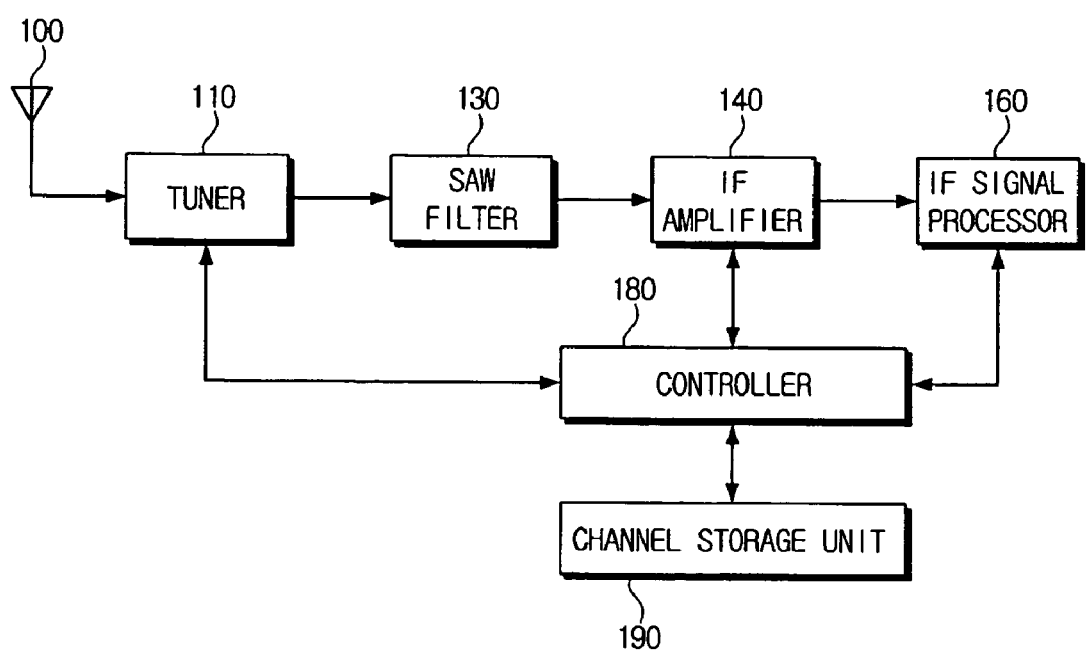
FIG. 2 is a block diagram illustrating a broadcast signal-receiving apparatus according to an embodiment of the present general inventive concept.

FIG. 2 is a block diagram illustrating a broadcast signal-receiving apparatus according to an embodiment of the present general inventive concept. As illustrated in FIG. 2, the broadcast signal-receiving apparatus includes an antenna 100, a tuner 110, a SAW filter 130, an IF amplifier 140, an IF signal processor 160, a controller 180, and a channel storage unit 190.

The tuner 110 converts an RF signal received through the antenna 100 into an intermediate frequency (IF) signal. That is, the tuner 110 can receive RF signals of an ATSC standard digital broadcast and an NTSC standard analog broadcast, and converts the RF signals to IF signals by mixing a frequency supplied from a local oscillator of the tuner 110 with an RF signal received on a first channel selected for viewing. When receiving an ATSC standard digital broadcast signal having a 6 MHz bandwidth, the tuner 110 converts a selected digital broadcast signal (i.e., received on the first selected channel) into an IF signal having a 44 MHz center frequency and a 6 MHz frequency bandwidth. The tuner 110 of the broadcast signal-receiving apparatus can then shift a frequency of the converted IF signal under the control of the controller 180, which is described below.

The SAW filter 130 removes interferences of analog and digital broadcast signals on a channel contained in the IF signal that is adjacent to the selected digital broadcast signal. That is, the SAW filter 130 has a predetermined frequency bandwidth about a center frequency and passes digital IF signals that are within the predetermined frequency bandwidth, thereby filtering noise signals that are not included in the digital IF signals that are passed (i.e., noise signals that are adjacent to broadcast signals, or the like, on high- and low-band channels other than the digital IF signals). When the selected digital broadcast signal is of VSB system, the SAW filter 130 has a center frequency of 44 MHz, and the SAW filter 130 filters the IF signal over a wider bandwidth than 6 MHz.

The IF amplifier 140 receives and amplifies a digital IF signal filtered by the SAW filter 130 to a predetermined magnitude. That is, the IF amplifier 140 amplifies the digital IF signal under an automatic gain control (AGC) of the controller 180, to compensate for a loss of magnitude that occurs in the SAW filter 130.

The IF signal processor 160 demodulates the amplified digital IF signal, and corrects errors occurring in the demodulated data. That is, after demodulating the amplified digital IF signal into I and Q signals, the IF signal processor 160 converts the I and Q signals into digital data. The IF signal processor 160 then compares the converted digital data with a predetermined data as to the digital IF signal to determine whether the converted digital data matches the predetermined data. If the converted digital data is different from the predetermined data, the IF signal processor 160 determines that there are errors present in the converted digital data. The IF signal processor then corrects the errors in the converted digital data.

The channel storage unit 190 stores information about all channels, such as channel numbers, channel frequencies, broadcast programs, etc., contained in digital broadcasts and analog broadcasts which can be received through the antenna 100.

The controller 180 first reads channel frequency information stored in the channel storage unit 190, and determines whether there are channels that are adjacent to the first channel selected for viewing. If the controller 180 determines that there are channels that are adjacent to the selected first channel on both sides thereof, the tuner 110 does not shift the IF frequency but instead displays the selected digital broadcast signal received on the first channel selected for viewing. If the controller 180 determines that there is an adjacent channel on one side of the selected first channel, the controller 180 frequency-shifts the digital IF signal on the selected first channel.

Figure 3:
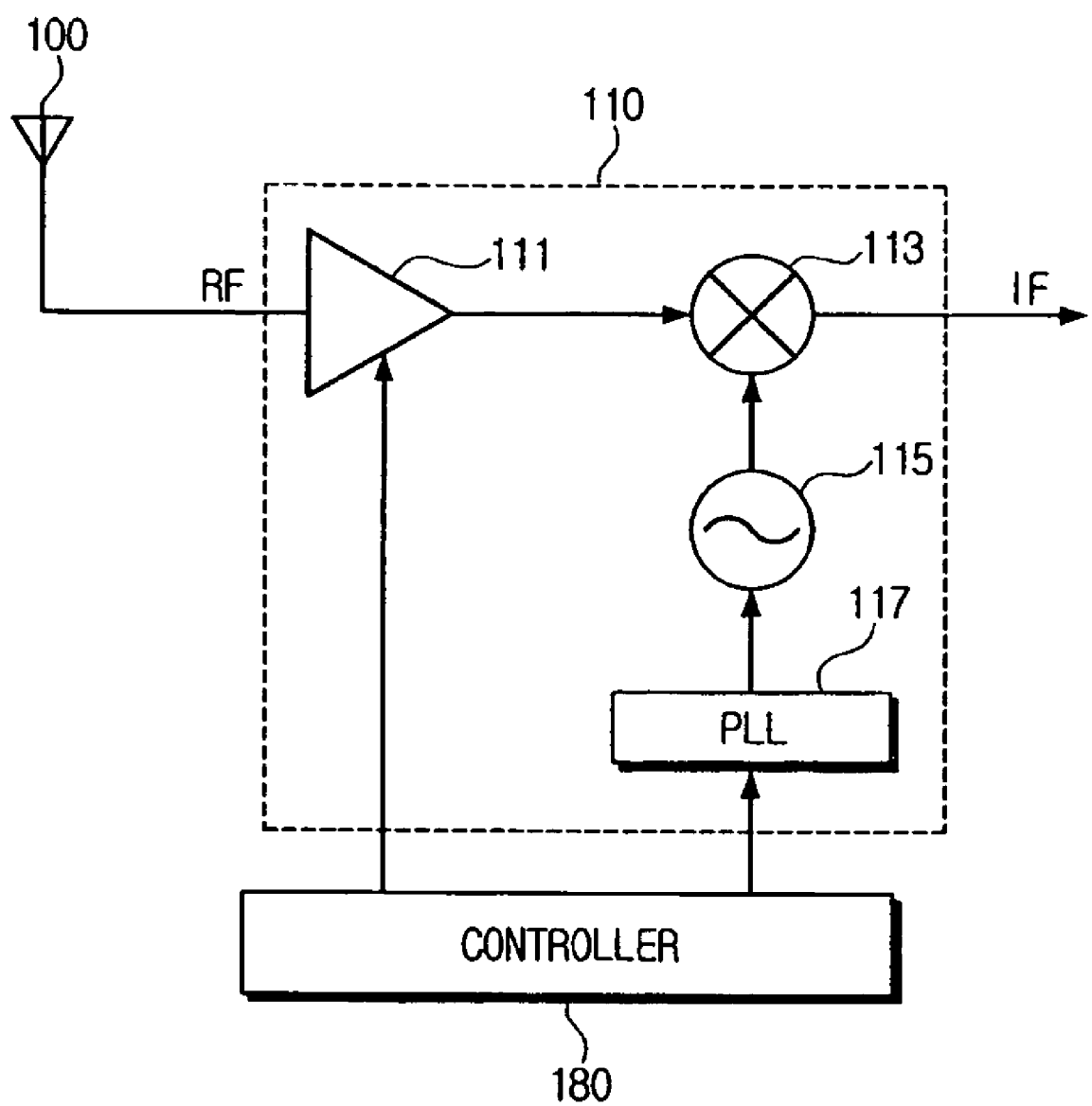
FIG. 3 illustrates a tuner of the broadcast signal-receiving apparatus of FIG. 2.

That is, the controller 180 detects an automatic gain control value as to the digital IF signal that is input to the IF signal processor 160, and supplies the automatic gain control value to the tuner 110 and the IF amplifier 140 to adjust output gains of the tuner 110 and the IF amplifier 140. The controller 180 detects a bit error rate (BER) occurring in the error correction process from the IF signal processor 160, and controls the tuner 110 in order to reduce the bit error rate to have a value less than about $10^{-4}$. Other bit error rates may alternatively be used with embodiments of the present general inventive concept. FIG. 3 illustrates the operations described above in more detail, as follows.

FIG. 3 illustrates the tuner 110 of the broadcast signal-receiving apparatus of FIG. 2. As illustrated in FIG. 3, the tuner 110 of the broadcast signal-receiving apparatus includes an RF amplifier 111, a frequency mixer 113, a local oscillator (LO) 115, and a phase lock loop PLL 117.

The RF amplifier 111 receives an RF signal of a 6 MHz bandwidth from the antenna 100, reduces noise under the automatic gain control of the controller 180, and amplifies the RF signal to maintain a constant output of the RF signal. The frequency mixer 113 mixes a first frequency with a frequency of the RF signal output from the RF amplifier 111 in order to convert a center frequency of the RF signal to an IF signal having a center frequency of 44 MHz. A magnitude of the first frequency is a magnitude obtained from adding the center frequency of the received RF signal to the center frequency of the IF signal.

The local oscillator 115 generates the first frequency to convert the RF signal to a lower frequency (i.e., a frequency of the IF signal). The first frequency supplied from the local oscillator 115 and the frequency of the received RF signal are mixed in order to output the IF signal of 44 MHz. The local oscillator 115 can convert the first frequency to a second frequency to reduce a bit error rate. Since the second frequency is mixed with the frequency of the RF signal, the frequency of the IF signal is shifted to a frequency band in which noise signals exist. In other words, the second frequency shifts the IF signal and the noise signals such that the IF signal that corresponds to the first selected channel is positioned where the noise signals are positioned when the first frequency is used to convert the RF signal to the IF signal while the noise signals are positioned outside a boundary of a frequency band of the SAW filter 130. Thus, the noise signals are not included in the frequency bandwidth of the SAW filter 130 and are thereby filtered.

The PLL 117 controls the local oscillator 115 to supply a constant frequency. The local oscillator 115 is controlled to convert the first frequency to the second frequency to reduce the bit error rate under the control of the controller 180.

Figure 4A:
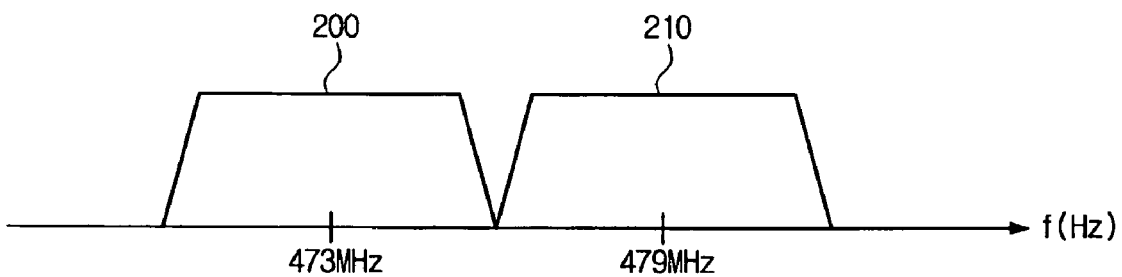
FIGS. 4A to 4C illustrate a noise signal filtering operation in the broadcast signal-receiving apparatus of FIG. 2.
Figure 4B:
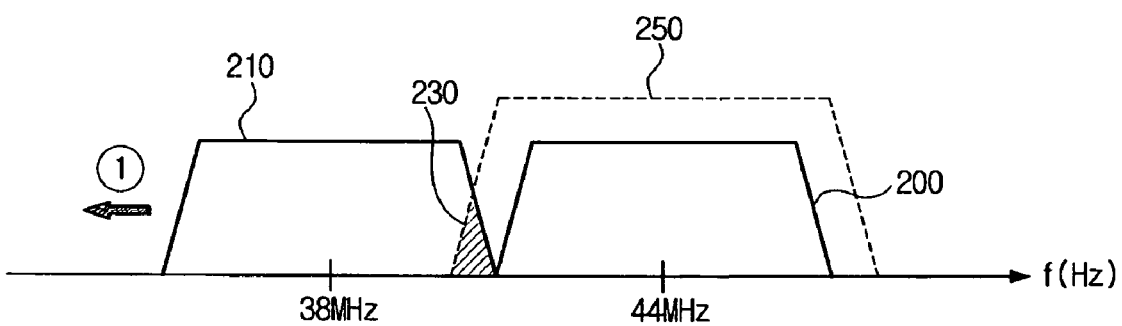
Figure 4C:
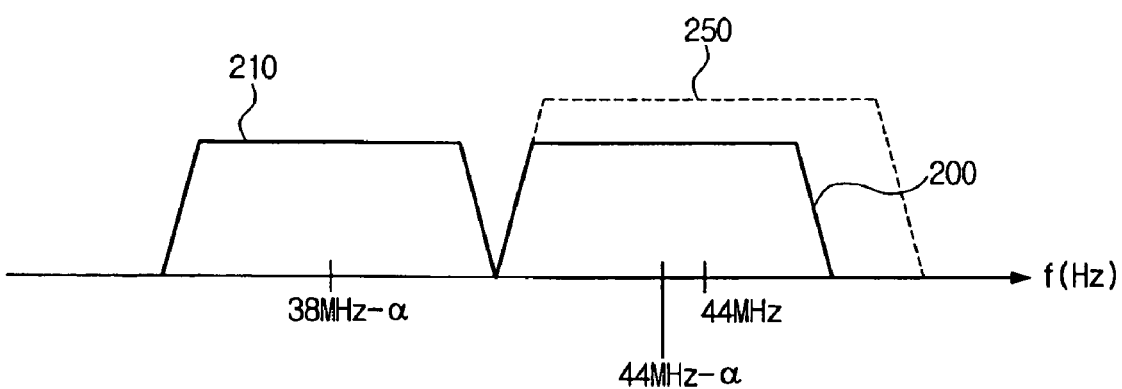

FIGS. 4A to 4C illustrate noise signal filtering operations of the broadcast signal-receiving apparatus according to an embodiment of the present general inventive concept. FIG. 4A illustrates an electronic spectrum including RF signals of a selected digital broadcast signal 200 and an upper-side adjacent signal 210. If the center frequency of the selected digital broadcast signal 200 is 473 MHz, the center frequency of the upper-side adjacent signal 210 is 479 MHz.

FIG. 4B illustrates an electronic spectrum including an IF signal that is converted from the RF signal received by the tuner 110. Since the electronic spectrum is inverted when the RF signal is converted to the IF signal, the center frequency of the selected digital broadcast signal 200 is shifted to 44 MHz, and the center frequency of the upper-side adjacent signal 210 is shifted to 38 MHz. As illustrated in FIG. 4B, a frequency bandwidth 250 of the SAW filter 130 contains noise signals 230 that are part of the adjacent signal 210.

FIG. 4C illustrates an electronic spectrum obtained when the IF signal of FIG. 4B is shifted in a lower direction (i.e., in the direction of the adjacent signal 210) in order to reduce the noise signals 230. The center frequency of the selected digital broadcast signal 200 is shifted to 44 MHz−α, wherein α is a value adjusted by the PLL 117. For example, if α has 170 KHz, the center frequency of the selected digital broadcast signal 200 is shifted to 43.83 MHz and the center frequency of the adjacent signal 210 is shifted to 37.83 MHz.

Once the IF signal is shifted and filtered in the manner described above, if the bit error rate is greater than $10^{-4}$, the controller 180 controls the PLL 117 to shift (i.e., re-shift) the center frequency of the selected digital broadcast signal 200 to 44 MHz−2α and the center frequency of the adjacent signal 210 to 38 MHz−2α.

Figure 5A:
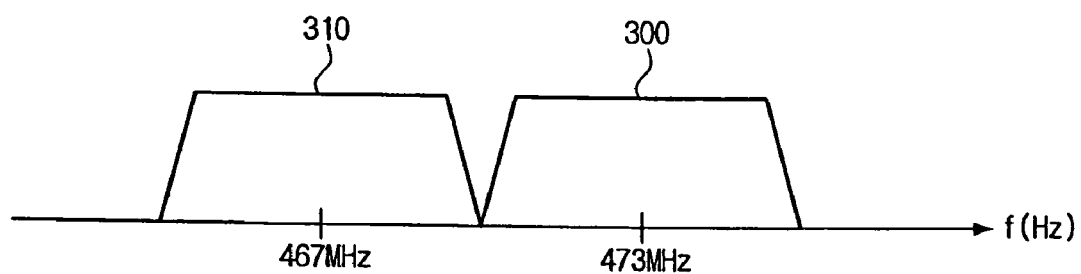
FIGS. 5A to 5C illustrate another noise signal filtering operation in the broadcast signal-receiving apparatus of FIG. 2.
Figure 5B:
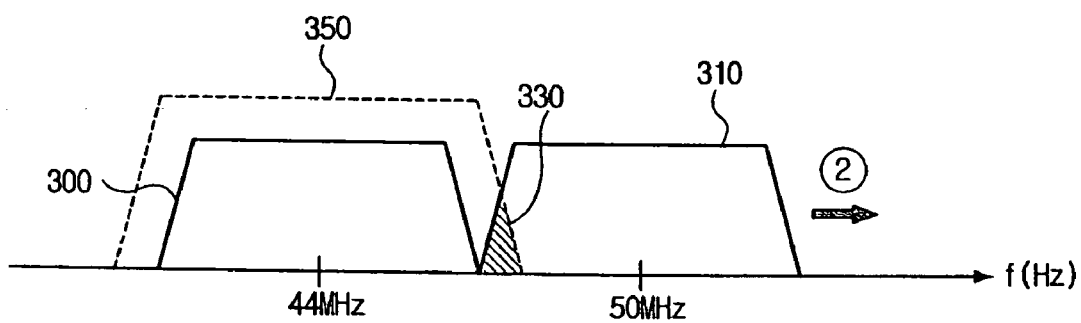
Figure 5C:
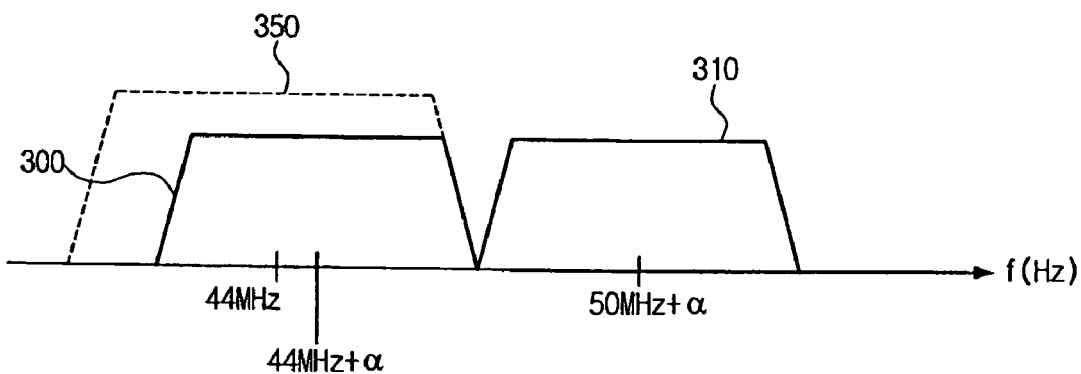

FIGS. 5A to 5C illustrate another noise signal filtering operation of the broadcast signal-receiving apparatus of FIG. 2. FIG. 5A illustrates an electronic spectrum including RF signals of a selected digital broadcast signal 300 and a lower-side adjacent signal 310. If the center frequency of the selected digital broadcast signal 300 is 473 MHz, the center frequency of the lower-side adjacent signal 310 is 467 MHz.

FIG. 5B illustrates an electronic spectrum including an IF signal that is converted from the RF signal by the tuner 110. The electronic spectrum is reversed when the RF signals are converted into the IF signal, therefore the center frequency of the selected digital broadcast signal 300 is shifted to 44 MHz and the center frequency of the lower-side adjacent signal 310 is shifted to 50 MHz. As illustrated in FIG. 5B, a frequency band 350 of the SAW filter 130 includes noise signals 330 that are part of the adjacent signal 310.

FIG. 5C illustrates an electronic spectrum obtained when the IF signal of FIG. 5B is shifted in an upper direction (i.e., in the direction of the adjacent signal 310) to reduce the noise signal 330. The center frequency of the selected digital broadcast signal 300 is shifted to 44 MHz+α, wherein α is a value adjusted by the PLL 117. For example, if a has 170 KHz, the center frequency of the selected digital broadcast signal 300 is shifted to 44.17 MHz and the center frequency of the adjacent signal 310 is shifted to 50.17 MHz.

Once the IF signal is shifted and filtered in the manner described above, if the bit error rate is greater than $10^{-4}$, the controller 180 controls the PLL 117 to shift the center frequency of the selected digital broadcast signal 300 to 44 MHz+2α and the center frequency of the adjacent signal 310 to 38 MHz+2α.

Figure 6:
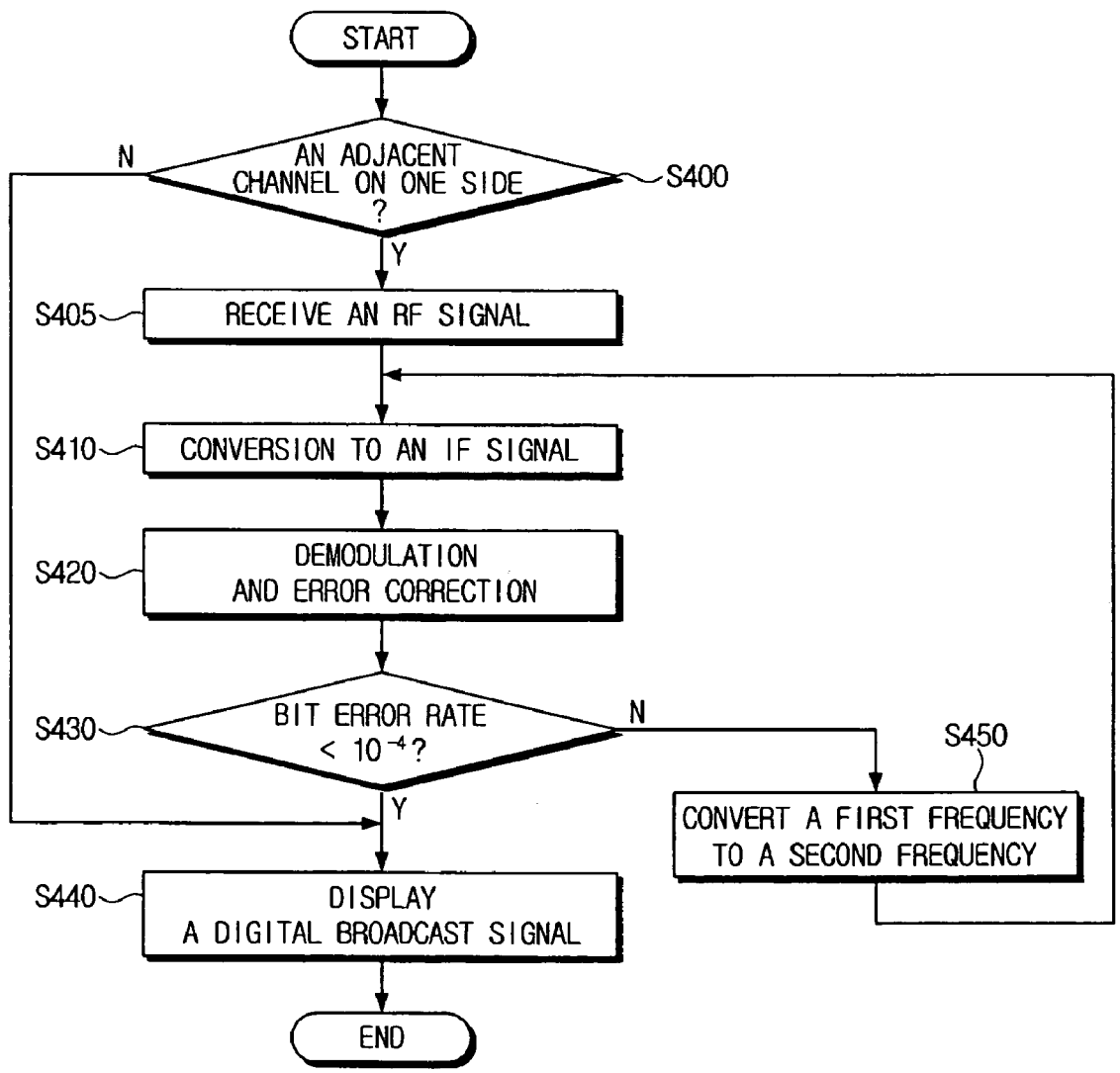
FIG. 6 is a flowchart illustrating a method of filtering a noise signal according to an embodiment of the present general inventive concept.

FIG. 6 is a flowchart illustrating a method of filtering noise signals according to an embodiment of the present general inventive concept. The method of FIG. 6 may be performed by the broadcast signal-receiving apparatus of FIG. 2. As illustrated in FIG. 6, the broadcast signal-receiving apparatus determines whether there are channels adjacent to the first channel selected for viewing from among channel frequencies of a plurality of channels contained in analog and digital broadcasts that can be received through the antenna 100 (operation S400). The first channel may be selected for viewing by a user.

If there are channels that are adjacent to the selected first channel on both sides thereof, a frequency of IF signals converted from the received RF signals is not shifted by the tuner 110, but a selected digital broadcast signal that is received on the selected first channel is displayed. If there is an adjacent channel on one side of the selected first channel, the RF signals on the selected first channel are received through the tuner 110 for processing (operation S405).

The first frequency generated by the local oscillator 115 is mixed with frequencies of the received RF signals to convert the RF signals into an IF signal (operation S410). The SAW filter 130 filters the IF signal to output a digital IF signal selected for viewing, and the IF signal processor 160 amplifies the digital IF signal to a predetermined magnitude, demodulates the digital IF signal, and corrects errors in the demodulated digital IF signal (operation S420).

The error correction operation detects the bit error rate and determines whether the bit error rate is less than $10^{-4}$ (operation S430). As described above, other bit error rates may also be used with the embodiments of the present general inventive concept. If the bit error rate has a value less than $10^{-4}$, the demodulated digital IF signal is signal-processed and displayed (operation S440). If the bit error rate has a value greater than $10^{-4}$, the first frequency generated to convert the RF signal to a lower frequency (i.e., the IF signal) can be adjusted to the second frequency to reduce the bit error rate (operation S450). In other words, the first frequency is mixed with the RF signal to convert the RF signal to the IF signal by shifting the center frequency thereof. The first frequency can be selected in such a manner that the IF signal corresponds to a frequency bandwidth of the SAW filter 130 such that noise signals are filtered and are passed with the digital IF signal. The bit error rate is measured to determine how close the IF signal is shifted to a boundary of the frequency bandwidth of the SAW filter 130. When the bit error rate is too large, the IF signal is shifted closer to the boundary of the frequency bandwidth of the SAW filter 130 by changing the frequency that is mixed in with the RF signal (i.e., from the first frequency to the second frequency). Thus, by shifting the IF signal, more of the noise signal can be eliminated by shifting the noise signal out of the frequency band of the SAW filter 130. The bit error rate provides feedback as to the effectiveness of the filtering operation that is performed in operation S420. The operations S410 to S430 can then be repeated when the frequency generated to convert the RF signal is changed. Accordingly, the operations described above can frequency-shift the IF signal in a direction to reduce the bit error rate.

In view of the foregoing, various embodiments of the present general inventive concept can prevent noise signals from being passed in a frequency bandwidth of a SAW filter by shifting an IF signal in order to reduce a bit error rate to less than a predetermined value, thus filtering the noise signals resulting from adjacent analog and digital broadcast signals.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A broadcast signal-receiving apparatus to receive and process analog and digital broadcast signals of a radio frequency (RF) signal format, comprising:
a tuner to convert an RF signal to a lower frequency signal to output an intermediate frequency (IF) signal;
a filter to filter the IF signal to output a digital IF signal; and
a controller to control the tuner to shift a frequency of the IF signal to a frequency band that is suitable to remove noise signals with the filter when noise signals of a predetermined magnitude are contained in the digital IF signal,
wherein the controller determines whether there are noise signals by using a bit error rate.

2. The broadcast signal-receiving apparatus as claimed in claim 1, further comprising:
a channel storage unit to store channel frequency information about a plurality of channels that are receivable through the tuner; and
an IF signal processor to demodulate the digital IF signal and to correct errors in the demodulated digital IF signal,
wherein the controller checks the channel frequency information stored in the channel storage unit to determine whether there is an adjacent channel on one side of a selected first channel, and if there is a channel adjacent to the selected first channel, the controller detects a bit error rate when the IF signal processor corrects the errors in the demodulated digital IF signal, and controls the tuner to shift the frequency of the IF signal of the selected first channel to a frequency band to reduce the bit error rate.

3. The broadcast signal-receiving apparatus as claimed in claim 2, wherein the tuner comprises:
a frequency mixer to mix a frequency of the RF signal with a predetermined first frequency;
a local oscillator to generate the predetermined first frequency; and
a phase-lock loop (PLL) to control the local oscillator to generate the predetermined first frequency, and the controller controls the PLL to convert the predetermined first frequency to a predetermined second frequency to reduce the bit error rate to a value that is less than a predetermined value when the bit error rate that corresponds to the predetermined first frequency is larger than the predetermined value.

4. A broadcast receiving apparatus, comprising:
a tuner to receive an RF signal including one or more channels, and having a mixing unit to mix a frequency of a selected channel with a predetermined adjustable frequency such that the frequency of the selected channel is converted to a predetermined portion of a filter band,
wherein the mixing unit converts the frequency of the selected channel to the predetermined portion of the filter band by shifting a center frequency of the selected channel to a predetermined IF frequency, determines whether noise from an adjacent channel falls substantially outside the filter band, and re-shifts the center frequency of the selected channel closer to an end portion of the filter band when the noise from the adjacent channel does not fall substantially outside the filter band, and
wherein the mixing unit determines whether noise falls substantially outside the filter band by using a bit error rate.

5. The apparatus as claimed in claim 4, wherein the filter band comprises a SAW filter band having a lower boundary and an upper boundary.

6. The apparatus as claimed in claim 5, wherein the mixing unit converts the RF signal to an IF signal in the SAW filter band, and the apparatus further comprises:
an IF signal processor to demodulate the IF signal into display data, to determine an error rate of the display data, and to provide a feedback signal to the tuner to control the tuner to adjust the predetermined adjustable frequency such that the frequency of the selected channel is shifted closer to the lower boundary or the upper boundary of the SAW filter band.

7. The apparatus as claimed in claim 6, further comprising:
a channel storage unit to store information about a plurality of receivable channel signals; and
a controller to access the channel storage unit to determine whether there is a channel adjacent to the selected channel.

8. The apparatus as claimed in claim 5, wherein the predetermined adjustable frequency corresponds to one of the lower boundary and the upper boundary of the SAW filter band.

9. The apparatus as claimed in claim 5, wherein the one or more channels in the RF signal include the selected channel and an adjacent channel, and the mixing unit shifts the selected channel and the adjacent channel to one of the upper boundary and the lower boundary such that the selected channel is passed inside the one of the upper boundary and the lower boundary of the SAW filter band and the adjacent channel is filtered outside the one of the upper boundary and the lower boundary of the SAW filter band.

10. The apparatus as claimed in claim 5, wherein the one or more channels in the RF signal include the selected channel and an adjacent channel, and the mixing unit shifts the selected channel and the adjacent channel such that the selected channel and the adjacent channel are divided by one of the upper boundary and the lower boundary of the SAW filter band.

11. The apparatus as claimed in claim 5, wherein the predetermined adjustable frequency comprises a first predetermined frequency, and the mixing unit receives a feedback signal indicating a proximity between the frequency of the selected channel and the upper boundary or the lower boundary of the SAW filter band.

12. The apparatus as claimed in claim 11, wherein the mixing unit changes the first predetermined frequency to a second predetermined frequency to shift the frequency of the selected channel closer to the upper boundary or the lower boundary when the proximity is greater than a predetermined value.

13. The apparatus as claimed in claim 5, wherein the mixing unit converts a frequency of the one or more channels to an intermediate frequency and inverts the frequency of the selected channel and a frequency of an adjacent channel.

14. The apparatus as claimed in claim 5, wherein the tuner comprises:
a local oscillator to generate the predetermined adjustable frequency; and
a phase locked loop to change the predetermined adjustable frequency from a first frequency value to a second frequency value to shift the frequency of the selected channel closer to an end portion of the filter band.

15. The apparatus as claimed in claim 4, wherein the mixing unit repeatedly re-shifts the center frequency of the selected channel until an error resulting from the noise from the adjacent channel is less than a predetermined error value.

16. The apparatus as claimed in claim 15, wherein the mixing unit re-shifts the center frequency of the selected channel by multiples of a predetermined frequency.

17. A noise signal-filtering method usable in broadcast signal-receiving apparatus to receive and process analog and digital broadcast signal of a radio frequency signal format, the method comprising:
converting a frequency of an RF signal received on a selected first channel to a lower frequency to output an intermediate frequency (IF) signal if there is an adjacent channel on one side of the first channel;
filtering the IF signal to output a digital IF signal; and
shifting a frequency of the IF signal to a frequency band suitable to remove noise signals in the filtering operation if the digital IF signal is determined to contain noise signals of a predetermined magnitude,
wherein it is determined whether there is an adjacent channel by using a bit error rate.

18. The noise signal-filtering method as claimed in claim 17, wherein the shifting of the frequency of the IF signal comprises:
demodulating the digital IF signal and correcting errors in the demodulated digital IF signal;
detecting a bit error rate when correcting the errors in the demodulated digital IF signal; and
shifting the frequency of the IF signal to a frequency band having a bit error rate that is less than a predetermined value.

19. A method of filtering noise from a broadcast signal, the method comprising:
receiving an RF signal including one or more channels;
determining whether there is a channel adjacent to a channel selected from the one or more channels by using a bit error rate;
converting the RF signal to an IF signal of a predetermined frequency;
displaying a signal received on the selected channel included in the IF signal, when there is no adjacent channel or when there are adjacent channels on each side of the selected channel; and
processing the selected channel to eliminate noise from an adjacent channel by shifting a frequency of the IF signal from the predetermined frequency such that the selected channel corresponds to a boundary of a predetermined filter band and a frequency of the adjacent channel fails outside the boundary of the predetermined filter band, when there is one channel adjacent to the selected channel.

20. The method as claimed in claim 19, wherein the processing of the selected channel comprises determining whether a boundary between a frequency of the selected channel and the adjacent channel corresponds to the boundary of the predetermined filter band and shifting the frequencies of the selected channel and the adjacent channel closer to the boundary of the predetermined filter band when the boundary between the frequency of the selected channel and the adjacent channel is determined not to correspond to the boundary of the predetermined filter band.

21. The method as claimed in claim 19, wherein the processing of the selected channel comprises converting the RF signal including the one or more channels to an intermediate frequency (IF) signal and demodulating the IF signal to determine display data.

22. The method as claimed in claim 21, further comprising:
determining an error rate of the determined display data and adjusting the frequency of the selected channel and the adjacent channel when the determined error rate is greater than a predetermined error value.

23. The method as claimed in claim 21, wherein the processing of the selected channel comprises mixing a first predetermined frequency with the frequency of the selected channel to convert the frequency of the selected channel to an IF frequency in the predetermined filter band, and mixing a second predetermined frequency with the frequency of the selected channel and the adjacent channel when the frequency of the adjacent channel does not fall outside the predetermined filter band.

24. The method as claimed in claim 23, wherein the processing further comprises mixing a third predetermined frequency with the frequency of the selected channel and the adjacent channel when the frequency of the adjacent channel that is mixed with the second predetermined frequency does not fall outside the predetermined filter band.

25. A method of filtering noise in broadcast signals, the method comprising:
converting a frequency of a received signal containing one or more channels to a predetermined frequency in a filter band;
determining whether noise from an adjacent channel interferes with a signal of a selected channel that is passed by the filter band by using a bit error rate; and
shifting the converted frequency of the received signal in the filter band when noise from the adjacent channel interferes with the signal of the selected channel.

26. The method as claimed in claim 25, further comprising:
storing channel information about a plurality of receivable channels including channel frequencies.

27. The method as claimed in claim 26, further comprising;
accessing the stored channel information to determine whether there is a channel adjacent to the selected channel.

28. The method as claimed in claim 27, wherein the shifting of the converted frequency of the received signal comprises shifting the converted frequency of the received signal when it is determined that there is an adjacent channel on a single side of the selected channel, otherwise outputting the signal having the converted frequency.

29. The method as claimed in claim 25, wherein the received signal includes digital signals of a digital broadcast standard and analog signals of an analog broadcast standard.

* * * * *

UNITED STATES PATENT AND TRADEMARK OFFICE
CERTIFICATE OF CORRECTION

PATENT NO. : 7,605,838 B2
APPLICATION NO. : 11/218551
DATED : October 20, 2009
INVENTOR(S) : Young-jin Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 818 days.

Signed and Sealed this

Fifth Day of October, 2010

David J. Kappos
*Director of the United States Patent and Trademark Office*